United States Patent [19]

Parliment

[11] 4,041,185

[45] Aug. 9, 1977

[54] BLUEBERRY FLAVOR

[75] Inventor: Thomas Holden Parliment, New City, N.Y.

[73] Assignee: General Foods Corporation, White Plains, N.Y.

[21] Appl. No.: 744,836

[22] Filed: Nov. 24, 1976

Related U.S. Application Data

[63] Continuation-in-part of Ser. No. 607,319, Aug. 25, 1975, abandoned.

[51] Int. Cl.² .............................................. A23L 1/235
[52] U.S. Cl. .................................................. 426/534
[58] Field of Search ....................................... 426/534

[56] References Cited

PUBLICATIONS

Parliment et al., Identification of the Major Volatile Components of Blueberry, Journal of Food Science, vol. 40 (1975), pp. 762–763.
Chemicals used in Food Processing, publication 1274, 1965, National Academy of Science, Wash. D.C., pp. 133–134.
Arctander Perfume and Flavor Chemicals, 1969, publ. by the author, Montclair, N. J., Items No. 1597–1607, 1803.

*Primary Examiner*—Joseph M. Golian
*Attorney, Agent, or Firm*—Thomas R. Savoie

[57] ABSTRACT

A flavoring agent and a method of imparting to foodstuffs, especially beverages, a pleasant blueberry flavor and aroma by adding thereto a defined ratio range of linalool to a 5 to 7 carbon alcohol or aldehyde known for its fresh green note.

12 Claims, No Drawings

BLUEBERRY FLAVOR

This application is a continuation-in-part of Ser. No. 607,319, filed August 25, 1975, now abandoned.

BACKGROUND OF THE INVENTION

The present invention relates to new flavoring agents capable of imparting to foodstuffs the taste of blueberry which agents comprise linalool and at least an equal amount of a fresh green flavorant. More specifically, the invention relates to the discovery that blueberry flavor is obtained by combining linalool with a 5 to 7 carbon alcohol, aldehyde, or combination thereof known for its characteristic green taste.

The flavor components of blueberries have received little attention. However, Arctander, in his 1969 publication [Arctander, S. "Perfume and Flavor Chemicals," Vol. 2, Monograph 1803, S. Arctander, Publisher, Montclair, New Jersey (1969)] refers to Linalool, an essential component employed in the immediate invention as a compound used in, among other things, imitation blueberry flavor due to its peculiar creamy-floral, but not distinctly sweet taste. Thus, while linalool has been employed to impart the natural floral note of blueberries in imitation blueberry flavor, the fact that certain green-note-flavorants at specific concentrations in relation to the amount of linalool contribute the remaining flavor character to derive a natural blueberry flavor is new to the art.

SUMMARY OF THE INVENTION

I have discovered that a natural blueberry flavoring composition may be derived by combining linalool with at least an equal part by weight of a 5 to 7 carbon alcohol, aldehyde, or combinations thereof having a fresh green flavor some of which I have further discovered as being natural components of blueberries. Exemplary of the suitable compounds which may be employed are cis-3-hexenol, trans-2-hexenal, trans-2-hexenol, and combinations thereof. Surprisingly, when linalool is combined with one or more of the naturally-occurring green flavorants at their naturally-occurring ratios, a blueberry flavor is not obtained. In fact, a sharp, very green and fatty flavor is derived. A critical ratio range of linalool to at least one of these components or similar 5 to 7, and preferably 6 carbon green flavorant not naturally present in the blueberry, has been determined whereat such a flavor is derived.

The compounds of this invention are stable in foodstuffs as well as being readily soluble in both aqueous and non-aqueous media such as glycerol, propylene glycol, 1,3-butylene glycol, as well as aqueous-based solutions of dry alcohols such as sorbitol and the like, as well as mixtures of the same. This makes the flavoring compounds of this invention suitable for dry food systems, for example, confections such as cake mixes, cookie mixes, blueberry muffin mixes, pancake mixes, blueberry tart-type systems, breakfast biscuits, candy, dry beverage powders, chewing gum; semi-moist systems such as fruit-flavored yogurts, ices, syrups, jams, jellies, gelatins, puddings, pie fillings and liquid systems such as fruit flavored beverages and the like. One may also conceive of such compounds being incorporated into pharmaceutical systems such as mouthwashes, or in dried form into a tablet such as a chewable vitamin or lozenge which would not only cause a pleasant, sweet, perfumy sensation to be experienced after having allowed the medicinal lozenge to dissolve in the mouth, but would effectively mask any unpleasant aftertaste due to the medicine itself.

It is, therefore, a principal object of this invention to provide a new flavoring composition which, when incorporated into foodstuffs and pharmaceuticals alike, will impart to the same a pleasant, natural, blueberry flavor.

DESCRIPTION OF THE INVENTION

It has been found that trans-2hexenal, trans-2-hexanol and cis-3-hexenol in addition to linalool are among the naturally flavor components of the blueberry. However, when these flavor constituents are combined at their naturally-occurring ratios, surprisingly, a blueberry flavor is not obtained. Most significant, therefore, is the two-fold discovery that the desirable blueberry flavor can be obtained outside the environment of the blueberry when combined at a specific ratio range and that 2) all of the natural flavor components with the exception of linalool may be substituted in whole or in part by at least one 5 to 7 carbon substituted, or unsubstituted alcohol or aldehyde having a fresh green note to derive a blueberry flavor virtually identical to that derived when only the natural flavor components are employed.

Therefore, while reference has heretofore been made principally to the use of the aforementioned naturally-occurring aldehydes and alcohols, the essentialities of this invention rest in the combination of linalool with at least an equal amount by weight and preferably a major amount of at least one saturated or preferably unsaturated 5 to 7 and preferably 6 carbon alcohol or aldehyde known in the art to possess a fresh green flavor at a very specific ratio range. According to this invention, the total concentration of green flavorant or combination of green flavorants in relation to the amount of linalool present is appreciably lower than the concentration of naturally-occurring green flavorants to linalool in the blueberry. The range of this invention has been determined to be on the order of 1:1 to 1:10 and preferably from about 1:1 to about 1:4 parts linalool to green flavorant or combination thereof respectively. A ratio of about 1:2 to about 1:4 is considered optimum. Due to the fact that trans-2-hexenal, trans-2-hexenol and cis-3-hexenol are natural components of blueberry and since they represent preferred 6 carbon aldehydes and alcohols respectively, they are the preferred green flavorants employed with about a 1:2 ratio of linalool to cis-3-hexenol being the preferred embodiment of this invention.

The amount of synthetic blueberry flavor necessarily present for obtention of a natural blueberry flavor in a given food or pharmacological system is necessarily that amount effective to impart the same which is relatively well-defined. It is appreciated that concentrations above and below those to be defined may be employed where a predominance of either the floral bouquet or the green is desired.

In a liquid system such as a beverage, it has been determined that at least about 0.0001% linalool by weight of the liquid beverage, typically about 0.0001% and 0.0005% and preferably about 0.00025% to 0.0005% and a maximum of about .001% of the same should be present in order that the floral bouquet of blueberries be demonstrated. This means that for every 100 ml. of liquid beverage, from about 0.1 to about 1 microliter of linalool, typically about 0.1 to about 0.5 microliters and preferably from about 0.25 to about 0.5 micro-liters should be contained in the liquid system. Conversely, at least an equal amount of a 5 to 7 carbon flavorant or mixture thereof and preferably not appreciably more than four times as much flavorant or mixture of flavorants than linalool must be present, a concentration of 2 to 4 times as much flavorant being desirable. This means that in a liquid system from about 0.1 to 4.0 microliters, typically from about 0.1 to 2.0 microliters and preferably about 0.25 to 2.0 microliters of flavorant by weight of the liquid system will be utilized. Consequently, in the preferred embodiments of this invention, the optimum amount of linalool present in a liquid system is 0.25 to 0.5 microliters linalool per 100 ml. of the system in combination with 0.25 to 2.0 microliters of cis-3-hexenol. Where trans-2-hexenal is used as the sole flavorant, or where trans-2-hexenol is similarly evaluated, a more sharp, green, and in the latter case, apple-like flavor is noted. Although the combination of trans-2-hexenal and trans-2-hexenol as the flavorant employed shows a marked improvement in flavor quality, cis-3-hexenol has by far the superior green note desired making it the preferred flavorant of this invention either alone with linalool or in combination with linalool and another 5 to 7 carbon flavorant.

In the case of dry foodstuff systems which herein are intended to include those systems previously referred to as "semi-moist," it has been determined that the amount of linalool and flavorant present is generally from 2 to 4 times the optimum amount present in a liquid. This is to say that the total concentration of linalool is in the range of about 0.0002% to about 0.004%, typically about 0.0002% to 0.002% and preferably 0.0005% to 0.002% by weight of the dry system. Similarly, the concentration of flavorant to be employed is generally on the order of 0.0002% to about 0.016%, typically about 0.0002 to 0.008% and preferably 0.0005% to 0.008% by weight of the dry system.

The discovery that linalool in conjunction with at least one 5 to 7 carbon aldehyde or alcohol of green flavor note gives a natural blueberry flavor at specific ratio ranges was indeed surprising since the flavorants of themselves, even those which are naturally present in the blueberry do not even hint of blueberry flavor when combined at their naturally-occurring ratios. Obtention of this flavor, therefore, rests in the critical ratios between each component of the flavor compositions. All evaluations were made in 100 mls. of a sucrose (9 gm.)/citric acid (0.5 gm.) aqueous solution base.

TABLE I

FLAVORS ASSOCIATED WITH VARYING *CONCENTRATION OF SEPARATE BLUEBERRY FLAVOR COMPONENTS

|  | 0.125ul | 0.25ul | 0.5ul | 1.0ul | 2.0ul |
| --- | --- | --- | --- | --- | --- |
| Linalool | — | citrusy | lemon woody citrusy | woody lemon | citrusy |
| Cis-3-Hexenol | — | — | nice green | sharp green | — |
| Trans-2-Hexenol | — | green apple | green spicey apple | sharp green | — |
| Trans-2-Hexenal | very sl.green | green | green | sharp green | — |

*Concentration is based on ul per 100 ml. of sucrose/citric acid base.

TABLE II

FLAVORS ASSOCIATED WITH VARYING *CONCENTRATIONS OF LINALOOL PLUS CIS-3-HEXENOL

Respective Conc. of
Linalool (ul) +    Corresponding Flavor

TABLE II-continued

| Cis-3-Hexenol (ul) | Ratio | Characteristics |
| --- | --- | --- |
| 0.03 + 0.12 | 1:4 | Weak Flavor |
| 0.06 + 0.25 | 1:4 | Fair to good fruity flavor, weak blueberry |
| 0.125 + 0.5 | 1:5 | Good Blueberry Flavor |
| 0.25 + 0.5 | 1:2 | Very Good Blueberry |
| 0.25 + 1.0 | 1:4 | Very Good Blueberry |
| 0.25 + 2.0 | 1:8 | Good Greenish Blueberry |
| 0.25 + 3.0 | 1:12 | Fair Greenish Blueberry |
| 0.5 + 0.5 | 1:1 | Very Good Blueberry |
| 0.5 + 1.0 | 1:2 | Very Good Blueberry |
| 0.5 + 2.0 | 1:4 | Fair Blueberry Too Green |
| 0.5 + 3.0 | 1:6 | Poor Green |
| 1.0 + 0.5 | 2:1 | Fair, Citrusy Berry |
| 1.0 + 1.0 | 1:1 | Fair to good, sharp Blueberry |
| 1.0 + 3.0 | 1:3 | Fair to Poor Olefinic Blueberry |
| 0.5 + 0.1 | 5:1 | Fair Citrusy |
| 0.5 + 0.25 | 2:1 | Fair to good Berry |
| Conc. of Linalool + Trans-2-Hexenol, respectively | | |
| 0.5 + 0.5 | 1:1 | Fair to Good Blueberry |
| 0.5 + 1.0 | 1:2 | Fair, Green-Apple Blueberry |
| 0.5 + 2.0 | 1:4 | Fair to Poor Green Olefinic Blueberry |
| Conc. of Linalool + Trans-2-Hexenal, respectively | | |
| 0.5 + 0.5 | 1:1 | Fair Lemon Green |
| 0.5 + 1.0 | 1:2 | Fair to Good Sharp Blueberry |
| 0.5 + 2.0 | 1:4 | Fair Green Blueberry |
| Conc. of Linalool + Cis-3-Hexenol + Trans-2-Hexenol, respectively | | |
| 0.25 + 0.5 + 0.5 | 1:2:2 | Good Blueberry |
| 0.25 + 0.5 + 1.0 | 1:2:4 | Fair to Good Blueberry, Too Green |
| 0.25 + 0.5 + 2.0 | 1:2:8 | Fair Green Apple |

*Concentration based on ul per 100 ml. of sucrose/citric acid base.

It will be apparent to those skilled in the art that non-appreciable variances from the ratio ranges stated and the minimum concentrations called for in foodstuffs may be made and the same results obtained. It is further appreciated that appreciable deviations from the maximum concentrations in these foodstuffs may be made where a strong blueberry flavor having more prominent green notes would be deisred. It is contemplated that these modifications are appreciated in the above disclosure where the end result in all instances is essentially blueberry flavor.

Since obtention of the blueberry flavor does not require any type of interaction between the components of the flavor composition or fixation of each to the other, the desirable blueberry flavor may be obtained by adding the components concurrently or sequentially to the particular food, beverage, or pharmaceutical system. When the components of this invention are to be utilized in dry form for incorporation into dry solid systems or where fixation of these components is generally desired, this may be accomplished by any method known in the art to effect the desired result without at the same time causing degradation of either component. Expemplary of such methods would include fixation by co-drying the flavor components on soluble, bland polysaccharides such as polyglucose, polymaltose, polymaltodextrins or the like, dextrins having D.E. of less than about 20 and starch hydrolysates to mention a few. Other known fixatives such as gums, for example, gum arabic, gum ghatti, xanthan gum, carboxymethyl cellulose, and the like are also appropriate. The preferred method is to co-freeze-dry an aqueous solution containing the flavor constituents since the same are readily oxidized by air. Consequently, spray drying and drum drying tend to lessen the activity of said constituents due to the slight oxidation and volatilization that takes place during these processes. However, spray drying may be employed where slight loss is of little concern, but drum drying should not be used due to the excessive heat involved unless the drum drying facility limits the amount of heat energy input to a point whereat a drum temperature not appreciably in excess of 180° F is utilized.

Due to the fact that the flavoring compositions of the present invention have a tendency to oxidize in air, a further embodiment of this invention is to employ in the systems in which these flavorants have been incorporated an antioxidant such as butylated hydroxy toluene (BHT) and/or butylated hydroxy anisole (BHA) in amounts effective to impart stability to said systems.

The invention will now be described by reference to the following operative example.

EXAMPLE I

Blueberry Concentrate

Nine hundred grams of highbush blueberries (*Vaccinium corymbosum*) were obtained from commercial sources. These were homogenized with 300 ml. water under a nitrogen atmosphere. The resultant slurry was vacuum distilled at 25 in. Hg (130° F) for 1 hour and the volatiles were trapped in a dry ice-acetone bath. This yielded 525 gm. of volatile material which was saturated with sodium chloride and extracted with three 200 ml. portions of diethyl ether. The ether was washed with a small quantity of 5% sodium carbonate to remove the free acids. The ethereal solution was then dried and concentrated by slow distillation to a volume of about 1 ml.

Separation and Identification

Separation of the mixture was accomplished by gas-liquid chromatography (GLC) in a Perkin-Elmer Model 990 gas chromatograph using 8' × ⅛ inch O.D. column containing 10% SP 1000 on Supelcoport, 80-100 mesh. The column was temperature programed from 60° C to 275° C at 6° C per min. Mass spectra were obtained using tandem gas chromatography-mass spectrometry. The column effluent was passed through a glass jet separator maintained at 275° C into the ion source of a DuPont Model 21-491 mass spectrometer. Mass spectra were obtained at 70 eV and a source temperature of 250° C.

Sample identification was accomplished by comparison of mass spectra and gas chromatographic retention times of the isolated materials to that of known standards. Where mass spectral identification was not unequivocal, as in the case of the trans-2-hexenal and trans-2-hexenol, infrared spectra were run as capillary films between sodium chloride plates on a Perkin-Elmer Model 467 infrared spectrophotometer. These compounds including the isomer cis-3-hexenol were all judged to contribute to the pleasant, fruity, fresh green character of blueberries. Organoleptic evaluation demonstrated that linalool also makes a major contribution to the characteristic flavor.

To demonstrate the organoleptic importance of these compounds, a 1:2 mixture of linalool to cis-3-hexenol respectively was evaluated in a sucrose-citric acid base. The consensus of an informal benchtop evaluation of this system was that it possessed the character impact of fresh blueberries.

EXAMPLE II

A typical liquid beverage according to the present invention can have the following formulation on a dry basis:

1.28 g carbonation source
1.12 g malic acid
0.28 g sodium bicarbonate
12.50 g sucrose The resultant dry carbonated beverage concentrate was then admixed with 100 ml. of cold water to which was added 0.75 microliters of a blueberry flavorant consisting essentially of a 1:2 weight ratio of linalool to cis-3-hexenol. The liquid beverage has the natural taste of blueberry.

EXAMPLE III

The same formulation was prepared as in Example II except that instead of sugar, L-aspartyl-L-phenylalanine methyl ester was used as the sole sweetening source in a sweetness equivalent amount.

The above examples and explanations are for the purpose of teaching those skilled in the art how to practice the invention. Upon reading the above disclosure, those skilled in the art will be aware of a number of modifications and variations. It is contemplated that these modifications and variations be included within the scope of the present invention which is defined by the following claims.

I claim:
1. A blueberry flavoring composition comprising linalool and a flavorant selected from the group consisting of trans-2-hexenol, trans-2-hexenal, cis-3-hexenol, cis-3-hexenal and combinations thereof, the linalool and flavorant being combined in a weight ratio of about 1:1 to about 1:4 and the flavoring composition effective to impart a blueberry flavor to a liquid foodstuff when employed at a level of about 0.1 to 1.0 microliters linalool and about 0.1 to 4.0 microliters of flavorant per 100 ml. of liquid and to a dry foodstuff system when employed at a level of about 0.0002% to 0.004% linalool and about 0.0002% to 0.016% flavorant by weight of the dry system.

2. The composition of claim 1 wherein the linalool and flavorant are at a respective weight ratio of about 1:2 to about 1:4 respectively.

3. The composition of claim 1 wherein the flavorant is cis-3-hexenol.

4. The composition of claim 3 wherein linalool and cis-hexenol are at a respective weight ratio of about 1:2 to about 1:4 respectively.

5. A Method of imparting to foodstuffs the pleasant flavor of blueberry which comprises adding to the foodstuff either concurrently or sequentially linalool and a flavorant selected from the group consisting of trans-2-hexenol, trans-2-hexenal, cis-3-hexenol, cis-3-hexenal and combinations thereof, the linalool and flavorant being in a respective weight ratio of about 1:1 to about 1:4, the total concentration of linalool and flavorant in the foodstuff being about 0.1 to 1.0 microliters linalool and about 0.1 to 4.0 microliters of flavorant per 100 ml. of foodstuff where the foodstuff is a liquid and about 0.0002% to 0.004% linalool and about 0.0002% to 0.016% flavorant by weight of the dry system where the foodstuff is dry.

6. The method of claim 5 wherein the concentrations are about 0.1 to 0.5 microliters linalool and about 0.1 to 2.0 microliters of flavorant per 100 ml. of foodstuff where the foodstuff is a liquid and about 0.0002% to 0.002% linalool and about 0.0002% to 0.008% flavorant by weight of the dry system where the foodstuff is dry.

7. The method of claim 6 wherein the flavorant is cis-3-hexenol.

8. The method of claim 7 wherein the concentrations are about 0.25 to 0.5 microliters linalool and about 0.25 to 2.0 microliters of cis-3-hexenol per 100 ml. of liquid foodstuff and about 0.0005% to 0.002% linalool and about 0.0005% to 0.008% cis-3-hexenol by weight where the foodstuff is dry.

9. A blueberry flavored foodstuff which comprises the foodstuff and blueberry flavoring agent, the blueberry flavoring agent comprising linalool and a flavorant selected from the group consisting of trans-2-hexenol, trans-2-hexenal, cis-3-hexenol and cis-3-hexenal, the linalool and flavorant being in a respective weight ratio of about 1:1 to about 1:4, the concentration of the blueberry flavoring agent in a liquid foodstuff being about 0.1 to 1.0 microliters of linalool and about 0.1 to about 4.0 microliters of flavorant per 100 ml. of liquid and the concentration of blueberry flavoring agent in a dry foodstuff being about 0.0002% to 0.004% linalool and about 0.0002 to 0.016% flavorant by dry weight.

10. The foodstuff of claim 9 wherein the concentrations are about 0.1 to 0.5 microliters linalool and about 0.1 to 2.0 microliters flavorant per 100 ml. of foodstuff and about 0.0002% to 0.002% linalool and about 0.0002% to 0.008% flavorant by weight of dry foodstuff.

11. The foodstuff of claim 9 wherein the flavorant is cis-3-hexenol.

12. The foodstuff of claim 11 wherein the concentration are about 0.25 to 0.5 microliters linalool and about 0.25 to 2.0 microliters of cis-3-hexenol per 100 ml. of liquid foodstuff and about 0.0005% to 0.002% linalool and about 0.0005% to 0.008% cis-3-hexenol by weight of dry foodstuff.

* * * * *

UNITED STATES PATENT AND TRADEMARK OFFICE
CERTIFICATE OF CORRECTION

PATENT NO. : 4,041,185
DATED : August 9, 1977
INVENTOR(S) : Thomas Holden Parliment It is certified that error appears in the above-identified patent and that said Letters Patent are hereby corrected as shown below:

In column 2, line 10, change "trans-2-hexanol" to -- trans-2-hexenol -- .

In column 3, Table I, second line, change "*CONCENTRATION" to -- *CONCENTRATIONS -- ; opposite "Linalool" under column "0.5ul" delete "citrusy", under column "1.0ul" delete "lemon" and insert -- citrusy -- , under column "2.0ul", after "citrusy" insert -- lemon -- .

In column 3, Table II, fourth line, the headings should read:

-- Linalool (ul) +        Corresponding        Flavor --

In column 4, line 45, change "deisred" to -- desired -- ; line 61, change "Expemplary" to -- Exemplary -- .

In column 8, claim 12, line 2, change "tion" to -- tions -- .

Signed and Sealed this

Twenty-fifth Day of April 1978

[SEAL]

Attest:

RUTH C. MASON
Attesting Officer

LUTRELLE F. PARKER
Acting Commissioner of Patents and Trademarks